US009542281B2

(12) United States Patent
Schindler et al.

(10) Patent No.: US 9,542,281 B2
(45) Date of Patent: Jan. 10, 2017

(54) SYSTEMS AND METHODS FOR PROVIDING SNAPSHOTS OF APPLICATIONS TO REMOTE LOCATIONS WITH MINIMAL PERFORMANCE IMPACT

(71) Applicant: NetApp, Inc., Sunnyvale, CA (US)

(72) Inventors: Jiri Schindler, Jamaica Plain, MA (US); Stephen M. Byan, Littleton, MA (US)

(73) Assignee: NETAPP, INC., Sunnyvale, CA (US)

(*) Notice: Subject to any disclaimer, the term of this patent is extended or adjusted under 35 U.S.C. 154(b) by 218 days.

(21) Appl. No.: 14/029,572

(22) Filed: Sep. 17, 2013

(65) Prior Publication Data

US 2015/0081636 A1   Mar. 19, 2015

(51) Int. Cl.
  *G06F 11/14* (2006.01)
  *G06F 17/30* (2006.01)

(52) U.S. Cl.
  CPC ........ *G06F 11/1482* (2013.01); *G06F 11/1438* (2013.01); *G06F 17/30088* (2013.01); *G06F 2201/84* (2013.01)

(58) Field of Classification Search
  CPC . G06F 17/30; G06F 17/30088; G06F 11/1464
  See application file for complete search history.

(56) References Cited

U.S. PATENT DOCUMENTS

| | | | |
|---|---|---|---|
| 5,546,534 A * | 8/1996 | Malcolm | 714/6.3 |
| 6,606,685 B2 * | 8/2003 | Huxoll | 711/118 |
| 7,325,109 B1 * | 1/2008 | Muppalaneni | G06F 11/2082 707/999.104 |
| 7,467,167 B2 * | 12/2008 | Patterson | G06F 11/1464 |
| 7,836,267 B1 * | 11/2010 | Cross | 711/162 |
| 7,913,046 B2 * | 3/2011 | Kamay | G06F 17/30088 711/156 |
| 8,046,550 B2 * | 10/2011 | Feathergill | 711/162 |
| 8,224,778 B1 * | 7/2012 | Makin | 707/640 |
| 8,577,842 B1 * | 11/2013 | Nagargadde et al. | 707/639 |
| 9,201,887 B1 * | 12/2015 | Earl | G06F 17/30088 |
| 2007/0022144 A1 * | 1/2007 | Chen | G06F 11/2064 |
| 2007/0136541 A1 * | 6/2007 | Herz et al. | 711/162 |

* cited by examiner

*Primary Examiner* — Robert Beausoliel, Jr.
*Assistant Examiner* — Arthur Ganger
(74) *Attorney, Agent, or Firm* — Klein, O'Neill & Singh, LLP

(57) ABSTRACT

Systems and methods herein obtain snapshots of one or more applications, while having minimal impact on performance of the applications. Embodiments may involve obtaining snapshots of modified application data within a node without disturbing the operations of the application. Systems may be configured to leverage the fast characteristics of local storage devices while utilizing the advantages provided by the remote storage of data. One or more applications may be preconfigured to record data modifications in one or more associated application state storages located on local memory. Further, one or more systems may operate in the background to identify modifications made to the associated application state storages and to determine an appropriate moment to take one or more snapshots of the stored data and transfer the one or more snapshots to one or more remote locations to be stored. Several factors may be used to determine when an appropriate moment has occurred.

21 Claims, 3 Drawing Sheets

SYSTEMS AND METHODS FOR PROVIDING SNAPSHOTS OF APPLICATIONS TO REMOTE LOCATIONS WITH MINIMAL PERFORMANCE IMPACT

TECHNICAL FIELD

The present application relates generally to data storage and networks, and more particularly, to obtaining snapshots of data managed by one or more applications in a computing device with minimal performance impact.

BACKGROUND OF THE INVENTION

Computing devices execute applications and/or processes. In execution, the applications perform computations, input and output information, etc. all of which generates data. The data can be stored on a storage device local to the computing device or a system remote to the computing device. At any point in time, a computing device may experience a failure and lose the generated data, which may be catastrophic to the application and its users. As such, the industry has developed data recovery systems and methods in order to recover lost data in the event of a partial or complete device failure.

Traditional data recovery systems and methods may be grouped into one of two categories: local data recovery systems and remote data recovery systems. In both types of traditional data recover systems, the individual applications are tasked to be in operational command of the data backup operations, and in doing so, the applications periodically save their current application state. In local data recovery systems, the applications are configured to locally store the changes to the application state or possibly all of its state. In this approach, the application's current state is kept on a local storage device, which may be ideal for application performance and latency reduction; however, this traditional local storage approach requires that the applications dedicate large amounts of space on a storage device local to the computing device to store extra copies of the application data at various points in time. Over time, this sacrificed storage space becomes burdensome and cost prohibitive.

Further, this local recovery method becomes ineffective in the event of a device failure. As explained above, in traditional methods, the applications may save their state to local storage and thus effectively keep the changes to the application state on the local storage device. As such, if the computing device fails, then the local storage device storing the application's states likewise fails, and the data therein is lost. As such, when a device failure occurs, the lost data cannot be recovered.

In light of the inherent shortcomings of the traditional local recovery methods, the industry developed remote recovery systems and methods. In remote data recovery systems and methods, the applications are modified to coordinate with an external data recovery method employed by a storage device remote to the computing device. Moreover, the applications are further modified to periodically save its application state to the remote storage device. However, storing the application state to remote storage causes a new set of problems for the local device and its applications. For example, the application must be modified to send its data to a specific remote location. These modifications are time consuming and complicate the applications. Further, not all applications are modifiable, and as such, the remote recovery solution leaves may applications vulnerable to data loss. Further still, because each application must be modified to communicate with a specific remote system, upgrading a device and adding applications to the device becomes cumbersome and time consuming.

Another drawback of the remote recovery methods is latency. Because the application needs to periodically store its application state remotely, the transmission of the application's state information is in the critical path of the application performance. As such, when the application makes a record of the application's state, it sends the application state to a remote location for storage. Transmitting the application state causes a noticeable lag time in the application's execution because transmitting the application state to a remote storage location takes much more time than storing the application state on a local storage device as was done in the traditional local recovery method.

To resolve this lag time problem caused by traditional remote recovery systems, some traditional remote recovery systems reduced the frequency of creating application states and transmitting the application state the remote location. However, reducing the frequency of transmitting the application states makes the system device more vulnerable to data loss because a long amount of time may have lapsed between the transmission of the latest application state and the device failure. As such, to reduce the data loss vulnerability, some traditional remote recovery methods increase the frequency of transmitting the application states. Yet, increasing the frequency of the remote transmissions circles back to the original problem of traditional remote recovery systems, which increases application latency and causes the user to experience lag time while running the application.

BRIEF DESCRIPTION OF THE DRAWINGS

For a more complete understanding of embodiments herein, reference is now made to the following descriptions taken in conjunction with the accompanying drawing, in which.

DETAILED DESCRIPTION OF THE INVENTION

Figure 1:
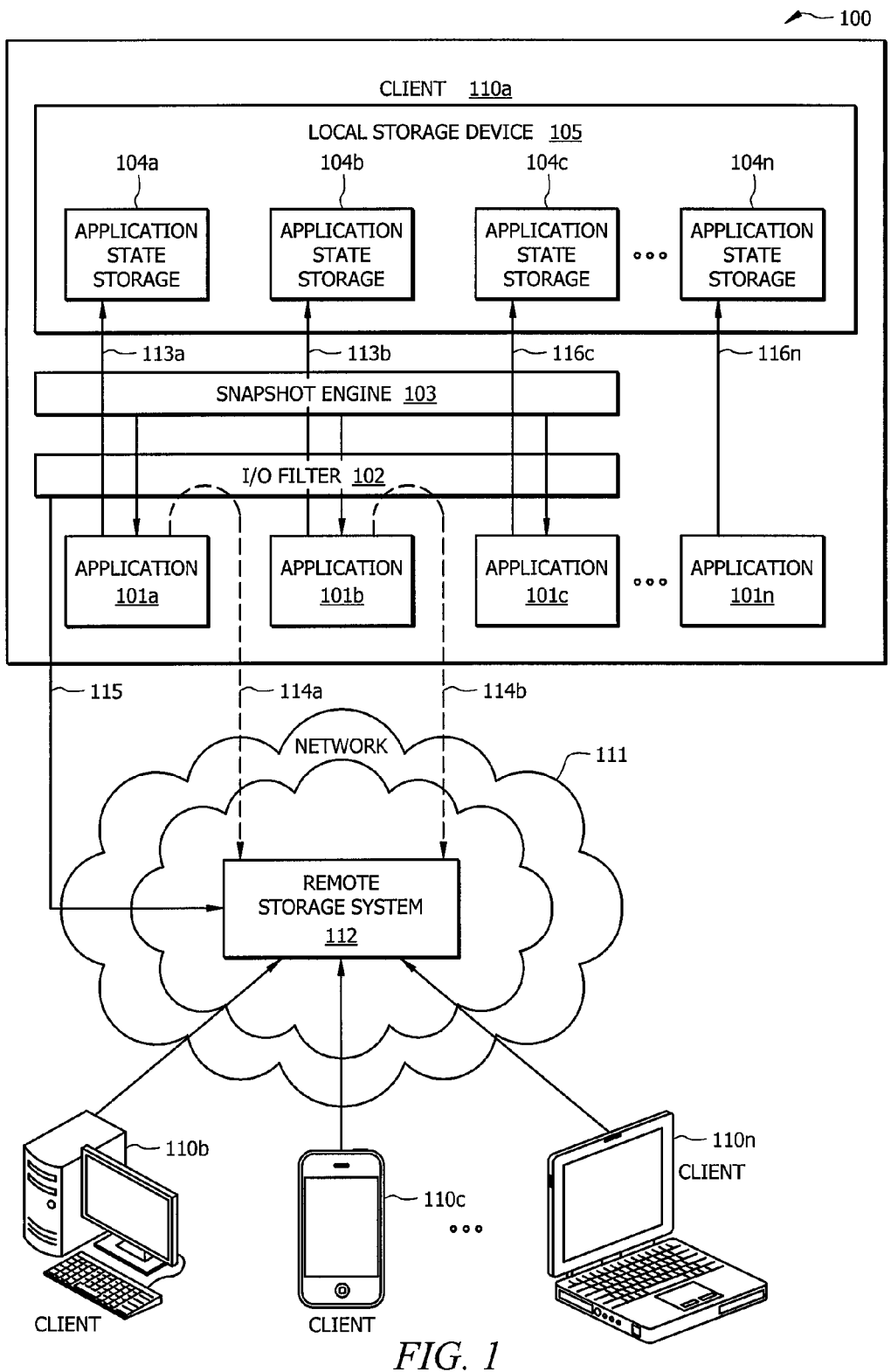
FIG. 1 illustrates a block diagram of a storage system in accordance with an embodiment of the present disclosure.

The present application provides for systems and methods which obtain snapshots of one or more applications, while having minimal impact on the performance and throughput of the one or more applications. Embodiments may involve a method of obtaining snapshots of modified application data within a computing device without explicitly disrupting operations of the application. In embodiments, systems and methods may be configured to leverage the fast characteristics of local storage-class memory while utilizing the advantages provided by the remote storage of data.

In embodiments, one or more applications are preconfigured to record their application state. An application state can commonly be thought of as the data the application accesses in order to perform computations. In example embodiments, the application may store some or all of its application state in one or more local storage device. Storing the application state in a local storage device provides for fast access and minimizes the performance impact on the applications. In embodiments, the one or more local storage device may be partitioned, such that the application state of one or more particular applications is stored in a corresponding application state storage.

Further, one or more example systems and methods may operate in the background to observe the input and output of data by an application. The exemplary systems and methods may be further configured to identify modifications made to data in the application state storage. Upon determining that an appropriate moment has occurred, the example background systems and methods may take the one or more snapshots of data in the one or more application state storages and transfer the one or more snapshot to one or more remote locations to be stored. Several factors may be used to determine when the aforementioned appropriate moment has occurred. One example factor may include determining that an application has reached a consistency point, whereby information in the application state storage is consistent with the application state perceived by external users.

Further, in embodiments, the one or more application may be preconfigured to record one or more subsets of their application state locally and other subsets of their application state remotely. In such embodiments, when the background systems and methods take a snapshot of a locally stored subset of an application state, the background systems and methods may also take a remote snapshot of a corresponding remotely stored subset of an application state and have the remote snapshot stored at the one or more remote locations.

With a snapshot (and optionally a remote snapshot) stored remotely from the computing device, embodiments may utilize advantages associated with the data being stored remotely, including but not limited to, recycling space of the local storage device, using the remotely stored data for data recovery should the computing device experience a partial or complete failure, and/or allowing the remotely stored data to be accessed and utilized by systems which are remote from the computing device (e.g., other clients, nodes, and systems of a cluster environment).

In embodiments, the one or more systems and methods, which operate in the background to track changes to an application state storage, take snapshots and transfer the snapshots without the application's knowledge and/or without modification to the applications. In other words, the background systems and methods disclosed herein operate invisibly to the applications providing for the obtaining of snapshots of one or more applications, while having minimal impact on performance and throughput of the one or more applications. Because the background systems and methods operate without the application's knowledge and/or modification, applications of the computing device may be added, updated, and removed from the computing device without having to modify the applications to coordinate with snapshot taking and snapshot data transmitting operations. Further, the performance of the applications will not be negatively affected by the application state tracking, snapshot taking, and snapshot transmitting.

The foregoing has outlined rather broadly the features and technical advantages of exemplary embodiments in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the invention.

FIG. 1 shows an example network comprising computing devices, for example, clients 110a-100n, which communicate with at least one remote storage system 112. Clients 110a-110n of embodiments may be located at a client site and/or an enterprise site and may comprise a processor (e.g., CPU, ASIC, PGA, etc.), memory (e.g., RAM, ROM, disk memory, optical memory, flash memory, and/or other suitable computer readable media), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. One or more of clients 110a-110n may be local or remote from each other, and/or any combination thereof. One or more of clients 110a-110n may be associated with each other or not associated with each other, and/or any combination thereof. One or more of clients 110a-110n may be owned and/or operated by the same user or different users, and/or any combination thereof. One or more of clients 110a-110n may be the same or similar devices and/or different devices, and/or any combination thereof. For example, client 110a may be a server, client 110b may be a personal computer, client 110c may be a cell phone and/or smart phone, and client 110n may be a laptop and/or tablet, and or the like, and/or any combination thereof. Throughout the description, if item numbers are related (for example 110a and 110n are related in that the item numbers share the same number (110) but have separate letter designations (a and n), then the related items may be collectively referred to herein by their number (for example, 110a-110n may collectively be referred to herein as 110).

Clients 110 may communicate with other systems and devices via network 111. Network 111 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 111, or a portion thereof, may provide infrastructure of network connections (not shown). Additionally, alternatively, network connections (not shown) may be provided by network infrastructure separate from network 111, wherein such separate network infrastructure may itself comprise a SAN, the Internet, the PSTN, a LAN, a MAN, a WAN, a wireless network, and/or the like.

Clients 110 may utilize network 111 to communicate with remote storage system 112. Remote storage system 112 may comprise various configurations suitable for providing operation as described herein. For example, remote storage system 112 may comprise processor-based systems, such as file server systems, computer appliances, computer workstations, etc. Accordingly, embodiments of remote storage system 112 comprise one or more processor (e.g., central processing unit (CPU), application specific integrated circuit (ASIC), programmable gate array (PGA), etc.), data store devices (e.g., random access memory (RAM), read only memory (ROM), disk memory, optical memory, flash memory, and/or other suitable computer readable media), and suitable input/output circuitry (e.g., network interface card (NIC), wireless network interface, display, keyboard, data bus, etc.). The foregoing processor-based system may operate under control of an instruction set (e.g., software, firmware, applet, code, etc.) providing operation as described herein. System 100 may be a cluster network environment in which remote storage system 112 comprises clustered storage server systems and methods, such as shared accessible storage for clients 110.

In embodiments, client 110*a* may comprise one or more applications and/or processes 101*a*-101*n*, which may be stored in memory and executed by one or more processors of client 110*a*. Some examples of applications 101 include but are not limited to both single-client and distributed or clustered applications such as database applications, word processor applications, video game applications, interne applications, etc. Applications 101 may be preconfigured to record their application states. An application state can commonly be thought of as the data the application accesses in order to perform computations. Client 110*a* may be configured to locally store some or all of the data of its application state.

Client 110*a* may also comprise at least one local storage device, for example, local storage device 105. Local storage device 105 may include one or more type of data storage device (e.g., random access memory (RAM), hard disk drive (HDD), solid state disk drive (SSD), optical memory, flash memory, memory, and/or other suitable computer readable media), and suitable input/output circuitry (e.g., network interface card (NIC), wireless network interface, display, etc.). Local storage device 105 may comprise one or more application state storage 104. In embodiments, application state storages 104 may store some or all of the data of an application state of one or more application. For example, application state storage 104*a* may be partitioned to store some or all of the data of the application state of application 101*a*. Likewise, application state storage 104*b* may be partitioned to store some or all of the data of the application state of application 101*b*; application state storage 104*c* may be partitioned to store some or all of the data of the application state of application 101*c*; and application state storage 104*n* may be partitioned to store some or all of the data of the application state of application 101*n*. In embodiments, local storage device 105 and application state storages 104 therein may be partitioned as is desired such that one or more application state storage 104 may be configured to store some or all of an application state of one or more application.

As such, application state storages 104 may be configured to merely store a subset of the data of an application state of an application. For example, application 101*a* may modify a subset of the data of its application state more frequently than another subset of the data of its application state. For simplicity reasons, a subset of an application state, which is modified frequently, may be called a change subset 113, while a subset of an application state, which is modified infrequently, may be called a stable subset 114. One or more subsets of an application state may be considered frequently modified, (e.g., change subset 113*a*) when modifications thereto are higher than one or more threshold levels of frequency. Likewise, one or more subsets of an application state may be considered infrequently modified, (e.g., stable subset 114*a*) when modifications thereto are lower than one or more threshold levels of frequency. Various ones of applications 101 may have the same or different frequency thresholds. Applications 101 may have more than two levels of subsets (e.g., application 101*a* may have more subsets than change subset 113 and stable subset 114). Further, applications 101 may store all data of their application state to their corresponding application state storage 104, as shown by example applications 101*c* and 101*n*, which sends their entire application state 116*c* and 116*n* to application state storage 104*c* and 104*n*, respectively.

Applications 101 may be configured to store one or more of the various subsets in varying locations. For example, application 101*a* may store its change subset 113*a* in application state storage 104*a*, and store its stable subset 114*a* in remote storage system 112. Storing change subset 113*a* in application state storage 104*a* may be advantageous because application state storage 104*a* is local to client 110*a* and therefore storage thereto results in minimal latency despite the high frequency with which the change subset is accessed and/or modified. Storing stable subset 114*a* remotely may be advantageous because it does not waste the limited capacity of local storage device 105, while at the same time, infrequently causes latency because the stable subset 114*a* is accessed and/or modified infrequently.

In embodiments, application state storages 104 may be solid state storage devices to ensure quick input and output of data. Further, in embodiments, application state storages 104 may be one or more various ones of logs, caches, database logs, write-ahead REDO or UNDO logs, and/or the like. In embodiments, a client may comprise a variety of application state storage types, wherein some may be logs, others may be caches, others may be systems logs, others may be storage types which are not logs, and/or the like, and/or any combination thereof.

In embodiments, application state storages 104 may have limited memory space dedicated thereto. As a result, an application state storage may be used as a temporary memory store wherein data is stored in the application state storage until it can be transferred to a different memory location. Upon the data being transferred to a different memory location, the memory space of the data, which was transferred to the different memory location, may be recycled, wherein the memory space is made available to store different data.

Of course local storage device 105 and/or application state storages 104 may be statically or dynamically partitioned as desired. For example, local storage device 105 and/or application state storages 104 may be partitioned, as is desired, such that a single application state storage may be associated with a single application (as shown in FIG. 1), several applications (not shown), or all applications of client 110*a* (not shown). Systems and methods disclosed herein operate on client 110*a* regardless of how local storage devices and/or application state storages are partitioned.

In an example operation, as application 101*a* is executed by one or more processors of client 110*a*, application 101*a* modifies data stored in application state storage 104*a*. For example, when application 101*a* performs an operation, application 101*a* may write change subset data 113*a* to application state storage 104*a* and/or modify change subset data 113*a* in application state storage 104*a*. In embodiments, the data stored in application state storage 104*a* may be temporality stored in application state storage 104*a* and thereafter moved to a different memory location. However, moving data from one memory location to another takes time. Embodiments herein avoid the lag time that an application would experience from transferring data from application state storage 104*a* to a different memory location by utilizing background systems and methods to perform the data transfers. As such, embodiments of system 100 comprise input/output (I/O) filter 102 and snapshot engine 103, which operate independently of applications 101 and aid in moving data from application state storages 104 to a different memory location.

In embodiments, client 110a may comprise one or more I/O filter 102 and one or more snapshot engine 103, which may coordinate to aid in moving data from application state storages 104 to a different storage location. I/O filter 102 and snapshot engine 103 may be a single component or may be separated into separate components as is desired. I/O filter 102 and/or snapshot engine 103 may be executable modules stored in memory and executed by at least one processor of client 110a. Additionally, or alternatively, I/O filter 102 and/or snapshot engine 103 may be hardware and comprise a processor and memory configured to operate as disclosed herein. I/O filter 102 and snapshot engine 103 are configured to observe the input and output of some or all applications 101. For example, I/O filter 102 and snapshot engine 103 may intercept data as it travels to/from some or all of application state storages 104 and/or data on remote storage system 112, I/O filter 102 and snapshot engine 103 may read data in some or all of application state storages 104 and/or data on remote storage system 112, and/or otherwise be knowledgeable of data in some or all of application state storages 104 and/or data on remote storage system 112. I/O filter 102 and snapshot engine 103 may be configured, as desired, such that it does not observe the operations or data of one of more of applications 101. For example, I/O filter 102 and snapshot engine 103 has been configured to ignore the operations and/or data of application 101n.

I/O filter 102 and snapshot engine 103 may operate in the background and independently from the applications. Thus, while I/O filter 102 and snapshot engine 103 are aware of some or all of applications 101, some or all of applications 101 may not be aware of I/O filter 102 and/or snapshot engine 103. Further, I/O filter 102 may perform its operations with no modifications to applications 101. Because I/O filter 102 and snapshot engine 103 may be made invisible to the applications, the operations of I/O filter 102 and snapshot engine 103 may avoid being in the critical operation path of applications 101, and therefore, the I/O filter's 102 and snapshot engine's 103 operations do not cause applications 101 to experience execution lag time. Said another way, applications 101 may not need to pause its operations while I/O filter 102 and snapshot engine 103 perform some or all of their operations.

As explained above, I/O filter 102 and snapshot engine 103 may be configured to aid in moving data from application state storages 104 to a different storage location. In embodiments, I/O filter 102 observes data being accessed in one or more application state storages (e.g., application state storage 104a). I/O filter 102 is configured to determine whether it is an appropriate time to move data from application state storage 104a to a different storage location. An appropriate time in which data may be moved may be called a checkpoint. A factor which may be used to determine whether a checkpoint has occurred may be the reaching of a consistency point, which may be considered a moment when an application and/or its application state storage reaches a steady state, a point of consistency, and/or a point in which application 101a is not in the process of an input/output function. One or more factors may be considered when determining whether a checkpoint has occurred including but not limited to triggers such as time, application state storage capacity, system resources, reaching a consistency point, etc. Further, different ones of applications 101 may have different operating procedures. As such, that which constitutes a checkpoint may be different for one or more applications. For example, I/O filter 102 may be configured to be aware of applications 101 and their specific operations. As such, I/O filter 102 may be operable to determine whether a checkpoint occurred for application 101a and operable determine whether a checkpoint occurred in application 101b, even if that which constitutes a checkpoint for application 101a is different from that which constitutes a checkpoint for application 101b.

Upon I/O filter 102 determining that a checkpoint has occurred (e.g. a checkpoint for application 101a and/or application state storage 104a) snapshot engine 103 may be configured to take a snapshot of data in application state storage 104a. If desired, a snapshot may be limited to only new or modified data in application state storage 104a. The snapshot data 115 may be transmitted to one or more other memory locations (e.g., remote storage system 112). To maintain application state storage consistency, I/O filter 102 is operable to temporarily freeze the data of application state storage 104a while snapshot engine 103 takes a snapshot of data in application state storage 104a. Freezing the data is helpful in preventing data of application state storage 104a from being altered while a snapshot is being taken. Further, I/O filter 102 may be configured to pause operations of application, which likewise helps prevent application data from being altered while a snapshot is being taken. Upon completion of the snapshot, application state storage 104a and/or application 101a may be unfrozen, wherein the application state storage and application are freed to change data and/or recycle the storage space of the snapshot data 115.

Snapshot engine 103 may be configured to aid in moving snapshot data 115 from application state storages 104 to a different storage location. In embodiments, snapshot engine 103 observes data being stored in one or more application state storages 104. Further, snapshot engine 103 may be configured to identify which data in a respective application state storage is new/modified information. In embodiments, some or all data in application state storage 104a may be moved to a different storage location in order to free up application state storage memory space, in order to make the data available to devices outside the client 110a, and/or to provide data recovery in the event of a partial or complete client failure. In embodiments, the portion of data that is moved is the data which was modified since the previous data relocation. Snapshot engine 103 may be operable to determine which data in application state storage 104a has been modified and/or is new since the previous relocation, such that in some embodiments, the data relocation may be limited to the modified data. Limiting the amount of data being relocated reduces the time it takes to relocate data and saves storage space of the storage system to which the data is being transferred.

Further, in embodiments, snapshot engine 103 may be configured to determine whether a trigger has occurred making it an opportune time to transfer data from one or more respective application state storage. Any number of triggers may be used to determine whether a data transfer would be desirable. For example, snapshot engine 103 may comprise a counter, timer, clock, etc., which triggers the snapshot engine to initiate a data transfer. In another example, snapshot engine may track the storage capacity of one or more application state storages 104 and initiate a data transfer upon the storage capacity of one or more application state storages 104 breaching a threshold. Storage capacity triggers could be used to prevent application state storage overflows and/or the like. Snapshot engine 103 may track the resource usage of one or more systems (e.g., applications 101, client 110a, local storage device 105, data transfer resources, remote storage system 112, and/or the like, and/or any combination thereof) and initiate a data transfer when resource usage is greater than a threshold. Further, in tracking the various resources, snapshot engine 103 may be configured to transfer data when the resource usage is below a threshold thereby preventing a data transfer from further depleting thinly available resources. Snapshot engine 103 may comprise more than one threshold wherein snapshot engine 103 initiates an action (e.g., data transfer) upon a first threshold being breached, escalates the action upon a second threshold being breached, and escalates the action further upon further thresholds being breached. When multiple tiered thresholds are implemented, the various thresholds may be tiered thresholds of the same trigger (e.g., higher and higher storage capacity triggers) and/or the various thresholds may be tiered thresholds of varying triggers (e.g., time, storage capacity, resource usage, etc.).

As described above, a plurality of factors may be involved in determining that a data transfer is to take place. In embodiments, I/O filter 102 and snapshot engine 103 may coordinate to determine that one or more snapshots should be taken and a data transfer will begin. For example, as described above, snapshot engine 103 may determine that a trigger has occurred in one or more application state storage and communicate to I/O filter 102 that a data transfer would be desirable for one or more application state storage. Upon learning that a data transfer would be desirable, I/O filter 102 may wait until a consistency point occurs in the one or more application state storage and/or the one or more application associated with the one or more application state storage. Upon I/O filter 102 determining that a consistency point occurred, snapshot engine 103 determines which data in the one or more application state storage is new/modified data, and snapshot engine 103 takes a snapshot of the new/modified data and transfers the snapshot to a remote location.

In preferred embodiments, the data is transferred to a remote location such as remote storage system 112. Transferring the data to a remote location makes the data available to other devices (e.g., clients 110b-110n) and protects the data should a partial or complete failure of client 110a occur. In the event of a partial or complete failure of client 110a, a system revert and/or recovery may be performed wherein the data transferred to the remote location may be restored to client 110a thereby minimizing the loss of data. If desired, the data may be transferred to a plurality of locations, for example, more than one remote storage systems, one or more storage devices local to remote client 110a, one or more storage devices of remote clients 110, and or any other location configured to receive a data transfer. Further, if desired, the snapshot may be transferred to a location that compiles several snapshots from one or more other clients, and may be used by a remote system to create a consistent snapshot of a plurality of clients in a storage network.

Figure 2:
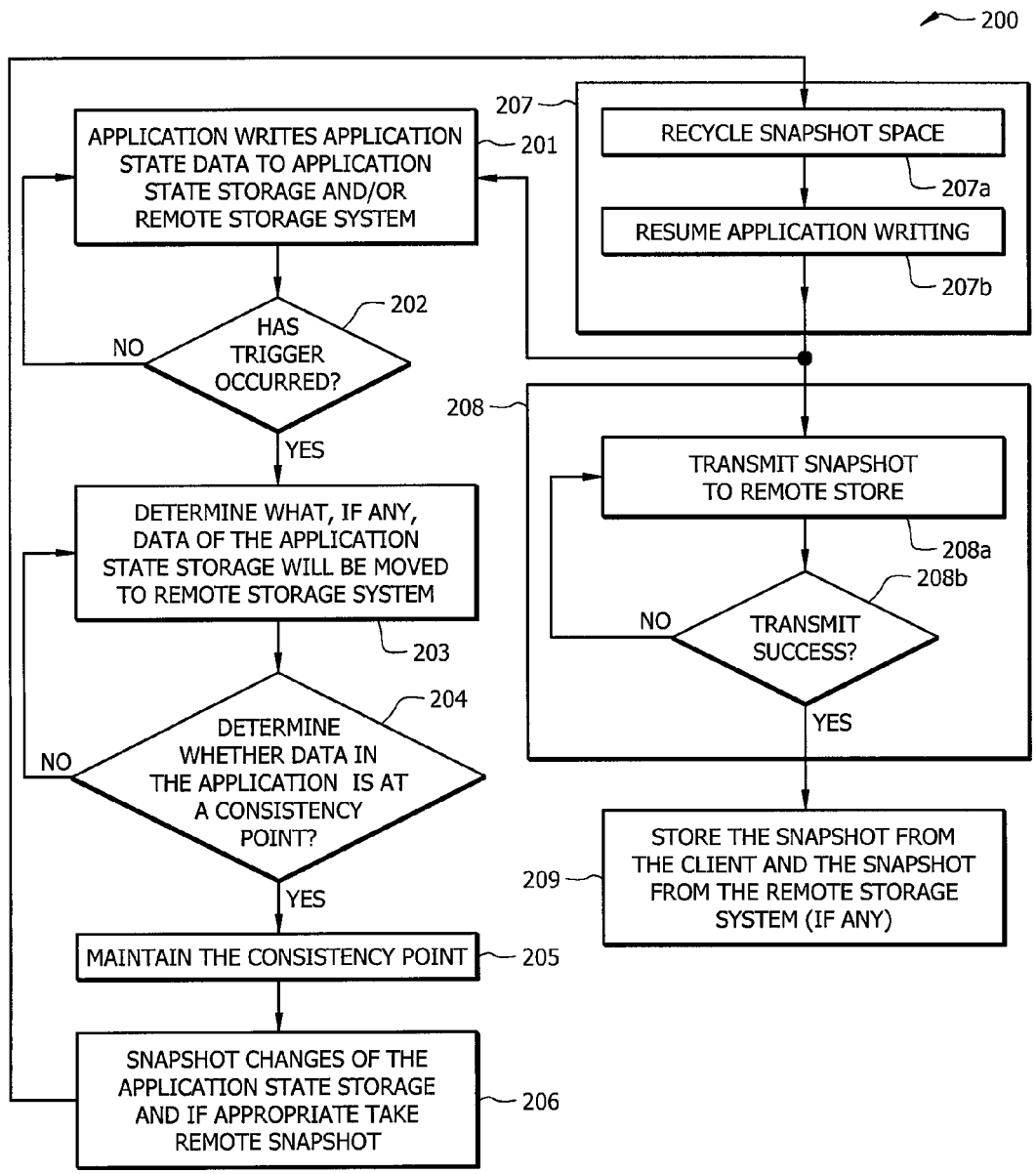
FIG. 2 illustrates a method for storing data in accordance with an embodiment of the present disclosure.

FIG. 2 shows an example method 200 of transferring data from a client to a remote storage system. The steps of FIG. 2 may be performed by the systems exemplified in FIGS. 1 and 3, among other systems. Further, the order in which the steps of FIG. 2 are performed are not essential and may be rearranged as is desired. Further, some of the steps (and/or part of one or more step) of FIG. 2 may be omitted if desired. In operation, method 200 may be performed on one application and/or application state storage of client 110a, a portion of applications and/or application state storages of client 110a, or all applications 101 and/or application state storages 104 of client 101a, at any given time. Further, one or more steps of method 200 may be performed by any of snapshot engine 103, I/O filter 102, client 110a, one or more processors of client 101a, and/or a combination thereof.

In step 201, one or more applications write some or all application state data to one or more respective application state storages in local storage. In this example, application 101a writes and/or modifies change subset data 113a in its associated application state storage 104a. Further, step 201 may comprise application 101a writing stable subset data 114a in remote storage system 112.

At step 202, the method determines whether a trigger has occurred. Examples of triggers, as described above include but are not limited to, a passing of time, storage capacity, resource availability, etc. At step 203, the method determines whether changes have been made to application state storage 104a since the last time data was transferred from application state storage 104a, and determines which data of the application state storage will be moved to remote storage system based on any determined changes. In embodiments, whether changes have been made to application state storage 104a may be an additional factor used in determining whether a snapshot should be taken and/or whether a data transfer should be initiated.

At step 204, which may occur before, during, or after step 203, the method determines whether the application is at a consistency point. An example of determining that an application is at a consistency point includes determining that the data in the application state storage is consistent with the application state perceived by external users. Whether a consistency point has been reached may be contingent on the I/O filter detecting a characteristic signature of a sequence of I/O operations to the application state storage. Further, whether a consistency point has been reached maybe contingent on the stable subset data being consistent with the application state perceived by external users. The method may be configured such that data is not transferred until a consistency point is reached thereby preventing partial data computations from be transmitted. As such, if the application is not at a consistency point, then the method waits until a consistency point is reached before moving to step 205. Upon determining that a consistency point has been reached, the method moves to step 205 wherein the method maintains the consistency point.

At step 205, the method maintains the consistency point by preventing the data of application state storage 104a from being deleted or overwritten, and by preventing the remote data, if any, from being written. For example, the method may temporarily pause, halt, and/or otherwise freeze application 101a such that application 101a does not delete or overwrite the data in application state storage 104a nor modify stable subset data 114 on the remote storage device 112, if any. Further, the method may temporarily pause, halt, or otherwise freeze the data in application state storage 104a such that the data in application state storage 104a and stable subset data 114 remains unmodified temporarily. In another example, the method may place a temporary marker in application state storage 104a (and/or remote storage device) above which data may not be modified and under which data may be modified. Data below the marker may be modified, but the modification will not affect the data transfer because the data below the marker will not be part of the data transfer. With the consistency point maintained, the method moves to step 206.

At step 206, the method takes a snapshot of the frozen modified data of application state storage 104a. The frozen modified data is the data of application state storage 104a which has been changed since the last data transfer (and/or snapshot) and is the data that has been maintained as part of the consistency point. In embodiments, I/O filter also takes a remote snapshot of modified stable subset data 114a, if it was determined that any stable subset data 114a had been modified since the previous snapshot of stable subset data 114a. The snapshot of application state storage 104a may be taken simultaneously and/or substantially simultaneously as the remote snapshot of modified stable subset data 114a thereby ensuring that the consistency point is maintained while both the snapshot and remote snapshots are taken.

When the snapshot (or snapshots) has been taken, the method moves to step 207. In step 207a, the method recycles the snapshot storage space of application state storage 104a, which stored the data that was snapshotted in step 206. The method may delete the snapshotted data, unlink the snapshotted data, and/or otherwise make the storage space available to be written over by new/modified data. Recycling the storage space makes the storage space available for other storage uses. In step 207b, the method resumes the operations of application 101a and/or application state storage 104a such that application 101a and 104a are unfrozen, unhalted, unpaused, etc., and data modification is allowed to occur again. The method then moves back to step 201 wherein application 101a is free to write data to application state storage 104a.

After step 207b, wherein the system resumes the operations of application 101a and moves back to step 201, the method may also move to step 208 wherein the data is relocated. In step 208a, the snapshot is transmitted to one or more remote storage system. The location to which the snapshot is transferred may be one or more pre-determined location. A list of one or more pre-determined locations may be stored locally and/or remotely from the client and managed by one or more local or remote component (e.g., the client, I/O filter 102, snapshot engine 103, and/or a remote system). Additionally and/or alternatively, step 208a may determine one or more the remote storage system to transfer the snapshot based on factors such as system bandwidth, storage capacity of the one or more remote storage systems, characteristics of the snapshotted information (e.g., the application's type, the snapshot's size, the snapshot's privacy settings, etc.), and/or the like. Then in step 208b, the method determines whether the transfer was successful. If the transmission failed, then the method goes back to 208a and again transmits the snapshot to the same or a different remote storage system. In embodiments, after taking the snapshot in step 206, the snapshot may be temporarily stored local to client 110a until steps 208a-208b are successfully completed, and thereafter purged. The method may perform steps 208a-208b until a successful transmission is achieved and/or until an event (e.g., a transmission failure time out) causes the loop of steps 208a-208b to end. In step 209, the snapshot is transferred from client 110a to remote storage system 112, and the snapshot of modified stable subset data 114a, if any, is stored at remote system 112.

In embodiments, step 208 may be performed before step 207, wherein the snapshot is transmitted to the remote storage location before the storage space is recycled and application operations are resumed. In such an embodiment, the hold on application 101a's operations may be prolonged to ensure that transmission has succeeded.

With all the steps of method 200 completed, a snapshot of the data, which was modified since the last snapshot, is safely stored at a remote location and available for use by client 110a and/or other clients of system 100. The snapshots may be used to perform data recovery in the event of a partial or complete failure of client 110a, and/or may be used by other clients 110 to access data of client 110a. Further, the snapshots may be used as part of a cluster snapshot management system as is described in commonly assigned U.S. patent application Ser. No. 13/938,693 entitled, SYSTEMS AND METHODS FOR PROVIDING AN EVENTUALLY-CONSISTENT SNAPSHOT OF NODES IN A STORAGE NETWORK, which was filed on Jul. 10, 2013, the full disclosure of which is incorporated herein by reference.

Figure 3:
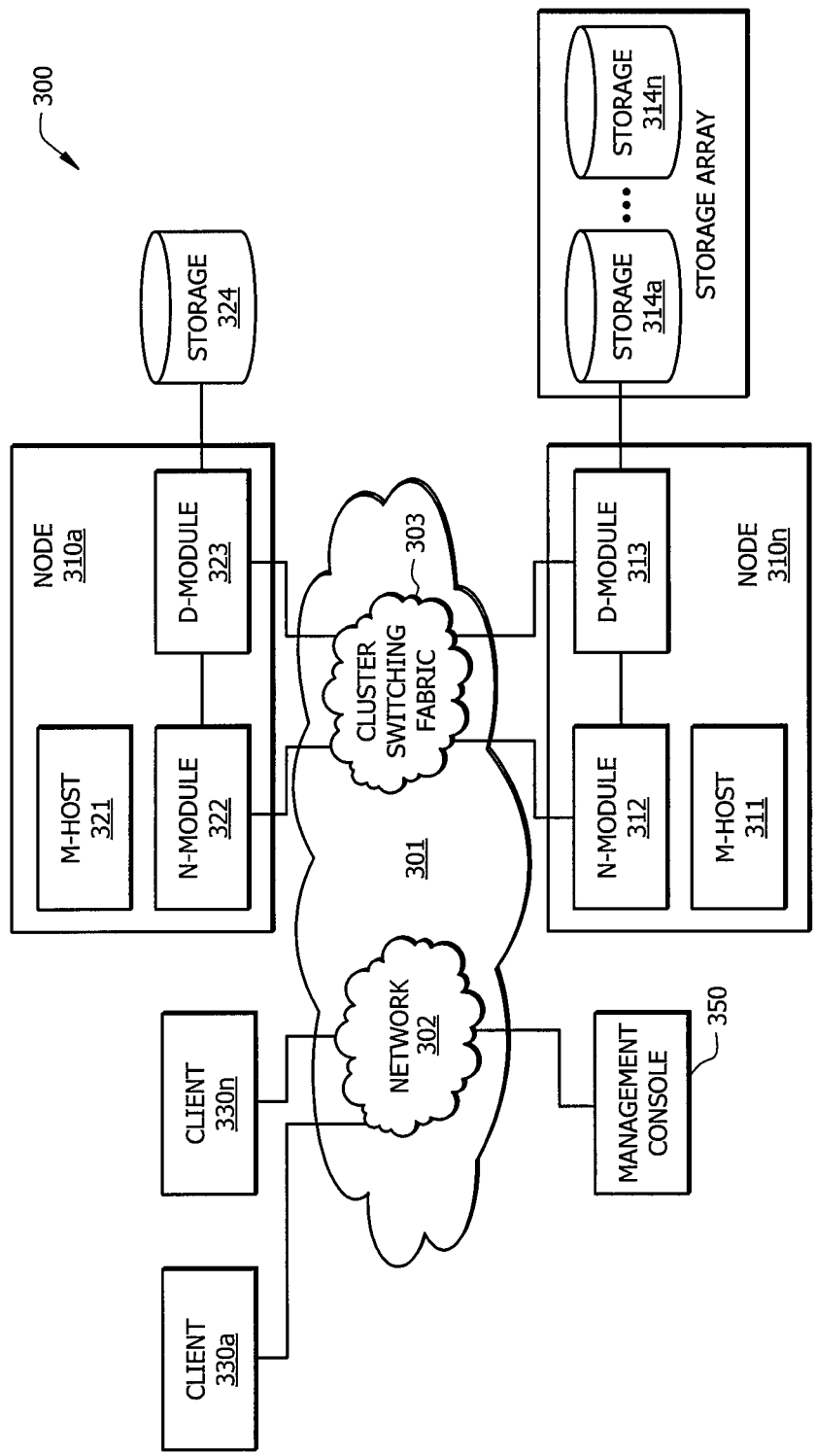
FIG. 3 illustrates a block diagram of a storage system in accordance with an embodiment of the present disclosure.

For example, FIG. 3 provides a block diagram of an example storage system 300, which may utilize one or more snapshots from client 110a to create a comprehensive snapshot of application data stored across some or all nodes in a clustered storage network. System 300 includes a storage cluster having multiple clients 330a-330n and constituent nodes 310a-310n which are adapted to communicate with each other and any additional clients and nodes of the cluster. Nodes 310a-310n are configured to provide access to data stored on a set of storage devices (shown as storage devices 314 and 324) constituting storage of system 300. Storage services may be provided by such nodes implementing various functional components that cooperate to provide a distributed storage system architecture of system 300. Additionally, one or more storage devices, such as storage array 314, may act as a central repository for storage system 300. It is appreciated that embodiments may have any number of edge nodes such as multiple nodes 310a-310n. Further, multiple storage arrays 314 may be provided at the multiple nodes 310a-310n, which provide resources for mirroring a primary storage data set.

Illustratively, nodes (e.g. network-connected devices 310a-310n) may be organized as one or more network elements (N-modules 312 and 322) and/or storage elements (D-modules 313 and 323) and a management element (M-host 311 and 321). N-modules may include functionality to enable nodes to connect to one or more clients (e.g. network-connected devices 330) over computer network 301, while D-modules may connect to storage devices (e.g. as may implement a storage array). M-hosts may provide cluster communication services between nodes for generating information sharing operations and for presenting a distributed file system image for system 300. Functionality for enabling each node of a cluster to receive name and object data, receive data to be cached, and to communicate with any other node of the cluster may be provided by M-hosts adapted according to embodiments of the invention.

It should be appreciated that network 301 may comprise various forms, and even separate portions, of network infrastructure. For example, network-connected devices 310a-310n may be interconnected by cluster switching fabric 303 while network-connected devices 310a-310n may be interconnected to network-connected devices 330 by a more general data network 302 (e.g. the Internet, a LAN, a WAN, etc.).

It should also be noted that while there is shown an equal number of N- and D-modules constituting illustrated embodiments of nodes, there may be a different number and/or type of functional components embodying nodes in accordance with various embodiments of the invention. For example, there may be multiple N-modules and/or D-modules interconnected in system 300 that do not reflect a one-to-one correspondence between the modules of network-connected devices 310a-310n. Accordingly, the description of network-connected devices 310a-310n comprising one N- and one D-module should be taken as illustrative only, and it will be understood that the novel technique is not limited to the illustrative embodiment discussed herein.

Network-connected devices 330 may be a general-purpose computer, cell phone, smart phone, tablet, laptop, and/or the like configured to interact with network-connected devices 310a-310n in accordance with a client/server model of information delivery. To that end, network-connected devices 330 may request the services of network-connected devices 310a-310n by submitting a read or write request to the cluster node comprising the network-connected device. In response to the request, the node may return the results of the requested services by exchanging information packets over network 301. Network-connected devices 330 may submit access requests by issuing packets using application-layer access protocols, such as the Common Internet File System (CIFS) protocol, Network File System (NFS) protocol, Small Computer Systems Interface (SCSI) protocol encapsulated over TCP (iSCSI), SCSI encapsulated over Fibre Channel (FCP), and SCSI encapsulated over Fibre Channel over Ethernet (FCoE) for instance.

System 300 may further include a management console (shown here as management console 350) for providing management services for the overall cluster. Management console 350 may, for instance, communicate with network-connected devices 310a-310n across network 301 to request operations to be performed at the cluster nodes comprised of the network-connected devices, and to request information (e.g. node configurations, operating metrics) from or provide information to the nodes. In addition, management console 350 may be configured to receive inputs from and provide outputs to a user of system 300 (e.g. storage administrator) thereby operating as a centralized management interface between the administrator and system 300. In the illustrative embodiment, management console 350 may be networked to network-connected devices 310-330, although other embodiments of the invention may implement management console 350 as a functional component of a node or any other processing system connected to or constituting system 300.

Management console 350 may also include processing capabilities and code which is configured to control system 300 in order to allow for management of tasks within network 300. For example, management console 350 may be utilized to configure/assign various nodes to function with specific clients, storage volumes, etc. Further, management console 350 may configure a plurality of nodes to function as a primary storage resource for one or more clients and a different plurality of nodes to function as secondary resources (e.g., as DR or HA storage resources) for the one or more clients.

In some embodiments, management console 350 may include processing resources which are configured to manage the obtaining of snapshots of application state of one or more clients (and or nodes) in a cluster without disturbing the functionality of one or more other clients and/or nodes in a cluster and without disturbing the one or more applications running on the one or more clients and/or nodes. Management console 350 may coordinate with the I/O filter and/or the snapshot engine of each of the client and/or nodes to obtain the snapshots. Such snapshots may be compiled under the control of management console in order to provide a consistent snapshot of the application state at each of the clients and/or nodes. For example, in a system where clients 330 and nodes 310 are cooperatively functioning in a clustered environment, management console 350 may monitor network traffic and/or take into consideration other factors such as potential traffic, parallel capabilities of the clients, nodes, storage arrays, etc., in order to control obtaining a snapshot from client 330a without disturbing the functionality of applications on client 330a and without disturbing the functionality of client 330n and/or nodes 310. Such actions allow client 330a to interact within storage network 300 without interruption while a snapshot of one or more applications of the clients and/or nodes are being obtained. With this snapshot, management console 350 may function to provide the snapshot information to other network resources such as an off-site DR storage network (not shown). Further, the snapshots may be used to provide a consistent snapshot of some or all of the clients and/or nodes in the storage network.

Although the exemplary embodiment and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   partitioning a local storage device into multiple segments at a computing system executing a plurality of applications, each segment configured to store a first set of application state data recorded by each application, where application state data is data that each application accesses to perform a computation;
   storing a second set of application state data recorded for each application at a remote storage device at one or more remote storage locations accessible to the computing system via a network connection, where the second set of application state data is accessed less frequently than the first set of application state data of each application;
   observing, by an input/output (I/O) filter, locally stored changes at the local device to the first set of application state data associated with at least one application, wherein the I/O filter operates invisibly to the at least one application;
   detecting that at least one trigger has occurred with respect to the first set of application state data associated with the at least one application;
   based at least on the detecting of the at least one trigger, identifying data of the locally stored changes to the first set of application state data of the at least one application for transfer to the one or more remote storage locations; wherein the at least one trigger is detected by detecting that an amount of data in the locally stored changes to the first set of application state data of the at least one application has breached a threshold amount of data;

determining, by the input/output (I/O) filter, that the at least one application has reached a consistency point when the at least one application is not performing an I/O function by detecting a characteristic of a sequence of I/O operations to the first set of application state data of the at least one application;

based at least on the determination, taking a snapshot of the identified data;

transferring the snapshot to the one or more remote storage locations;

observing, by the I/O filter, remotely stored changes to the second set of application state data associated with the at least one application; and based at least on the determination, taking a remote snapshot of the remotely stored changes to the second set of application state data associated with the at least one application, wherein the snapshot and the remote snapshot are stored at the one or more remote storage locations.

2. The method of claim 1, wherein the at least one trigger is detected by detecting that a predetermined amount of time has passed.

3. The method of claim 1, wherein the at least one trigger is detected by detecting that a threshold amount of system resources are available.

4. The method of claims 1, wherein the at least one trigger is a plurality of triggers, and wherein the triggers are tiered triggers.

5. The method of claim 1, further comprising:
maintaining data consistency while the snapshot is being taken.

6. The method of claim 1, further comprising:
after the snapshot has been transferred, recycling the local storage device space used for the snapshot.

7. A non-transitory, machine readable storage medium having stored thereon instructions for performing a method, comprising machine executable code which when executed by at least one machine, causes the machine to:

partition a local storage device into multiple segments at a computing system executing a plurality of applications, each segment configured to store a first set of application state data recorded by each application, where application state data is data that each application accesses to perform a computation;

store a second set of application state data recorded for each application at a remote storage device at one or more remote storage locations accessible to the computing system via a network connection, where the second set of application state data is accessed less frequently than the first set of application state data of each application;

observe, by an input/output (I/O) filter, locally stored changes at the local device to the first set of application state data associated with at least one application, wherein the I/O filter operates invisibly to the at least one application;

detect that at least one trigger has occurred with respect to the first set of application state data associated with the at least one application;

based at least on the detecting of the at least one trigger, identify data of the locally stored changes to the first set of application state data of the at least one application for transfer to the one or more remote storage locations; wherein the at least one trigger is detected by detecting that an amount of data in the locally stored changes to the first set of application state data of the at least one application has breached a threshold amount of data;

determine, by the input/output (I/O) filter, that the at least one application has reached a consistency point when the at least one application is not performing an I/O function by detecting a characteristic of a sequence of I/O operations to the first set of application state data of the at least one application;

based at least on the determination, take a snapshot of the identified data;

transfer the snapshot to the one or more remote storage locations;

observe, by the I/O filter, remotely stored changes to the second set of application state data associated with the at least one application; and based at least on the determination, take a remote snapshot of the remotely stored changes to the second set of application state data associated with the at least one application, wherein the snapshot and the remote snapshot are stored at the one or more remote storage locations.

8. The non-transitory storage medium of claim 7, wherein the at least one trigger is detected by detecting that a predetermined amount of time has passed.

9. The non-transitory storage medium of claim 7, wherein the at least one trigger is detected by detecting that a threshold amount of system resources are available.

10. The non-transitory storage medium of claims 7, wherein the at least one trigger is a plurality of triggers, and wherein the triggers are tiered triggers.

11. The non-transitory storage medium of claim 7, the machine executable code further causing the machine to:
maintain data consistency while the snapshot is being taken.

12. The non-transitory storage medium of claim 7, the machine executable code further causing the machine to:
after the snapshot has been transferred, recycle the local storage device space used for the snapshot.

13. The non-transitory storage medium of claim 7, wherein the snapshot is operable to be combined with other snapshots from remote nodes to create a network-wide snapshot of nodes within a distributed network.

14. A system comprising:
a memory containing machine readable medium comprising machine executable code having stored thereon instructions; and a processor module coupled to the memory, the processor module configured to execute the machine executable code to:

partition a local storage device into multiple segments at a computing system executing a plurality of applications, each segment configured to store a first set of application state data recorded by each application, where application state data is data that each application accesses to perform a computation;

store a second set of application state data recorded for each application at a remote storage device at one or more remote storage locations accessible to the computing system via a network connection, where the second set of application state data is accessed less frequently than the first set of application state data of each application;

observe, by an input/output (I/O) filter, locally stored changes at the local device to the first set of application state data associated with at least one application, wherein the I/O filter operates invisibly to the at least one application;

detect that at least one trigger has occurred with respect to the first set of application state data associated with the at least one application;

based at least on the detecting of the at least one trigger, identify data of the locally stored changes to the first set of application state data of the at least one application for transfer to the one or more remote storage locations; wherein the at least one trigger is detected by detecting that an amount of data in the locally stored changes to the first set of application state data of the at least one application has breached a threshold amount of data;

determine, by the input/output (I/O) filter, that the at least one application has reached a consistency point when the at least one application is not performing an I/O function by detecting a characteristic of a sequence of I/O operations to the first set of application state data of the at least one application;

based at least on the determination, take a snapshot of the identified data;

transfer the snapshot to the one or more remote storage locations;

observe, by the I/O filter, remotely stored changes to the second set of application state data associated with the at least one application; and based at least on the determination, take a remote snapshot of the remotely stored changes to the second set of application state data associated with the at least one application, wherein the snapshot and the remote snapshot are stored at the one or more remote storage locations.

15. The system of claim 14, wherein the at least one trigger is detected by detecting that a predetermined amount of time has passed.

16. The system of claim 14, wherein the at least one trigger is detected by detecting that a threshold amount of system resources are available.

17. The system of claims 14, wherein the at least one trigger is a plurality of triggers, and wherein the triggers are tiered triggers.

18. The system of claim 14, further causing the machine executable code to:

maintain data consistency while the snapshot is being taken.

19. The system of claim 14, further causing the machine executable code to:

after the snapshot has been transferred, recycle the local storage device space used for the snapshot.

20. The system of claim 14, wherein the snapshot is operable to be combined with other snapshots from remote nodes to create a network-wide snapshot of nodes within a distributed network.

21. The system of claim 14, wherein the processor module executes at least one snapshot engine to take the snapshot.

* * * * *